(12) United States Patent
Wetsch et al.

(10) Patent No.: US 10,926,506 B2
(45) Date of Patent: Feb. 23, 2021

(54) FANFOLD SUPPLY CART

(71) Applicant: PREGIS INNOVATIVE PACKAGING LLC, Deerfield, IL (US)

(72) Inventors: Thomas D. Wetsch, St. Charles, IL (US); Eric Charles Wright, Bolingbrook, IL (US)

(73) Assignee: Pregis Innovative Packaging LLC, Deerfield, IL (US)

( * ) Notice: Subject to any disclaimer, the term of this patent is extended or adjusted under 35 U.S.C. 154(b) by 744 days.

(21) Appl. No.: 15/593,144

(22) Filed: May 11, 2017

(65) Prior Publication Data

US 2018/0326692 A1  Nov. 15, 2018

(51) Int. Cl.
  *B62B 3/00* (2006.01)
  *B31D 5/00* (2017.01)
  (Continued)

(52) U.S. Cl.
  CPC ......... *B31D 5/0052* (2013.01); *B31D 5/0039* (2013.01); *B62B 3/002* (2013.01);
  (Continued)

(58) Field of Classification Search
  CPC ............................................. B31D 2205/0082
  See application file for complete search history.

(56) References Cited

U.S. PATENT DOCUMENTS

| | | |
|---|---|---|
| 1,391,433 A | 9/1921 | Wallin |
| 2,026,282 A | 12/1935 | Leguillon |

(Continued)

FOREIGN PATENT DOCUMENTS

| | | |
|---|---|---|
| DE | 19520907 | 1/1996 |
| EP | 0206806 A2 | 12/1986 |

(Continued)

OTHER PUBLICATIONS

Partial International Search Report and Written Opinion, dated Aug. 28, 2018 for International Application No. PCT/US2018/032352, filed May 11, 2018.

(Continued)

*Primary Examiner* — Erez Gurari
(74) *Attorney, Agent, or Firm* — Fox Rothschild LLP (57) ABSTRACT

Disclosed herein are protective packaging stock material units that are used in a dunnage system. A dunnage system includes a dunnage conversion machine and a supply station. The supply station is a cart that includes a biased support that is connected to a vertical side support. The biased support is movable from an open position to a closed position with respect to opposing vertical side supports. In the closed position, the biased support is configured to at least partially block the opening between the opposing vertical side supports. In the open position, the biased support leaves the opening between the opposing vertical side supports sufficiently open to load fanfold stock material therein. The biased support is biased towards the closed position and the open position. The supply station also includes an alignment device forming a funnel positioned under its base. The alignment device receives a dunnage machine stand base causing the supply cart to consistently align with the stand base in response to the stand base being slid into engagement with the alignment device.

26 Claims, 6 Drawing Sheets

(51) Int. Cl.
  *B65H 47/00*  (2006.01)
  *B65H 19/30*  (2006.01)
(52) U.S. Cl.
  CPC ..... *B65H 47/00* (2013.01); *B31D 2205/0017* (2013.01); *B31D 2205/0035* (2013.01); *B31D 2205/0047* (2013.01); *B31D 2205/0058* (2013.01); *B31D 2205/0082* (2013.01); *B65H 19/30* (2013.01); *B65H 2701/1824* (2013.01); *B65H 2701/1944* (2013.01); *B65H 2801/63* (2013.01)

(56) References Cited

U.S. PATENT DOCUMENTS

| | | | |
|---|---|---|---|
| 2,650,703 A | 9/1953 | Hagen et al. | |
| 3,001,735 A | 9/1961 | Francik | |
| 3,052,146 A | 9/1962 | Glendening | |
| 3,265,241 A | 8/1966 | Mccolgan | |
| 3,330,409 A | 7/1967 | Jorgensen | |
| 3,509,797 A | 5/1970 | Johnson | |
| 3,509,798 A | 5/1970 | Johnson | |
| 3,542,268 A | 11/1970 | Schramm | |
| 3,987,901 A | 10/1976 | Dullinger | |
| 4,022,396 A | 5/1977 | Manchester et al. | |
| 4,450,996 A | 5/1984 | Kamp | |
| 4,598,531 A | 7/1986 | Ruff et al. | |
| 4,699,609 A | 10/1987 | Komaransky et al. | |
| 4,830,186 A | 5/1989 | George | |
| 5,078,311 A | 1/1992 | Taguchi et al. | |
| 5,131,903 A | 7/1992 | Levine et al. | |
| 5,174,449 A | 12/1992 | Ball et al. | |
| 5,188,581 A | 2/1993 | Baldacc | |
| 5,219,126 A | 6/1993 | Schutz | |
| 5,222,601 A | 6/1993 | Takahashi et al. | |
| 5,232,430 A | 8/1993 | Nitsch | |
| 5,282,545 A | 2/1994 | White | |
| 5,310,056 A | 5/1994 | Ball et al. | |
| 5,322,477 A | 6/1994 | Armington et al. | |
| 5,377,570 A | 1/1995 | Giljam | |
| 5,387,173 A | 2/1995 | Simmons, Jr. | |
| 5,439,730 A | 8/1995 | Kelly et al. | |
| 5,474,250 A | 12/1995 | Birkmann et al. | |
| 5,829,231 A | 11/1998 | Harding et al. | |
| 5,864,484 A | 1/1999 | Harding | |
| 5,882,767 A | 3/1999 | Simmons, Jr. et al. | |
| 5,897,051 A | 4/1999 | Tessier | |
| 5,979,700 A | 11/1999 | Suess | |
| 6,007,016 A | 12/1999 | Helton | |
| 6,015,374 A | 1/2000 | Murphy et al. | |
| 6,033,353 A | 3/2000 | Lencoski et al. | |
| 6,168,847 B1 | 1/2001 | Murphy et al. | |
| 6,179,765 B1 | 1/2001 | Toth | |
| 6,202,889 B1 | 3/2001 | Veith | |
| 6,209,819 B1 | 4/2001 | Habisreitinger | |
| 6,237,449 B1 | 5/2001 | Orlosky | |
| 6,378,800 B1 | 4/2002 | Apichom | |
| 6,524,230 B1 | 2/2003 | Harding et al. | |
| 6,632,165 B1 | 10/2003 | Letourneau et al. | |
| 6,632,311 B1 | 10/2003 | Glenna et al. | |
| 6,695,247 B2 | 2/2004 | Widlund | |
| 6,702,212 B2 | 3/2004 | Abba et al. | |
| 6,756,096 B2 | 6/2004 | Harding | |
| 6,790,302 B2 | 9/2004 | Franz et al. | |
| 6,802,467 B2 | 10/2004 | Abba et al. | |
| 6,887,329 B2 | 5/2005 | Harding | |
| 6,910,997 B1 | 6/2005 | Yampolsky et al. | |
| 6,918,489 B2 | 7/2005 | Harding et al. | |
| 6,981,352 B2 | 1/2006 | Chow et al. | |
| 7,066,422 B1 | 6/2006 | Slocum | |
| 7,186,208 B2 | 3/2007 | Demers et al. | |
| 7,350,741 B1 | 4/2008 | Rosa | |
| 7,407,471 B2 | 8/2008 | Demers et al. | |
| 7,479,100 B2 | 1/2009 | Toth | |
| 7,481,163 B2 | 1/2009 | Theilacker | |
| 7,484,341 B2 | 2/2009 | Hidetoshi | |
| 7,585,268 B2 | 9/2009 | Cheich et al. | |
| 7,614,994 B2 | 11/2009 | Harding et al. | |
| 7,651,455 B2 | 1/2010 | Yampolsky et al. | |
| 7,695,037 B2 | 4/2010 | Rhodes | |
| 7,789,819 B2 | 9/2010 | Slovencik | |
| 7,794,382 B2 | 9/2010 | Cheich | |
| 7,815,989 B2 | 10/2010 | Cheich et al. | |
| 8,016,735 B2 | 9/2011 | Wetsch et al. | |
| 8,425,393 B2 | 4/2013 | Cheich | |
| 8,554,363 B2 | 10/2013 | Sperry et al. | |
| 8,555,761 B2 | 10/2013 | Keily et al. | |
| 8,813,953 B2 | 8/2014 | Wegener | |
| 8,820,238 B2 | 9/2014 | Brandenburg et al. | |
| 8,900,111 B2 | 12/2014 | Wetsch et al. | |
| 9,321,235 B2* | 4/2016 | Cheich | B31D 5/0047 |
| 9,505,549 B2 | 11/2016 | Yap | |
| 9,533,465 B2 | 1/2017 | Lintala | |
| 9,567,121 B2 | 2/2017 | Aya | |
| 10,093,070 B2* | 10/2018 | Lintala | B31D 5/0047 |
| 2002/0066689 A1 | 6/2002 | Lando | |
| 2002/0100539 A1 | 8/2002 | Harding | |
| 2002/0139890 A1 | 10/2002 | Toth | |
| 2003/0073558 A1 | 4/2003 | Chesterson et al. | |
| 2003/0092552 A1 | 5/2003 | Armington et al. | |
| 2003/0216236 A1* | 11/2003 | Harding | B31D 5/0047 493/350 |
| 2004/0142806 A1 | 7/2004 | Coppus et al. | |
| 2005/0181924 A1 | 8/2005 | Demers | |
| 2005/0247220 A1 | 11/2005 | Brandenburg et al. | |
| 2006/0138273 A1 | 6/2006 | Reinke | |
| 2007/0117703 A1 | 5/2007 | Cavaliere, Jr. et al. | |
| 2007/0117704 A1 | 5/2007 | Toth | |
| 2007/0119725 A1 | 5/2007 | Rhodes | |
| 2008/0054012 A1 | 3/2008 | Long | |
| 2008/0076653 A1 | 3/2008 | Shaw et al. | |
| 2008/0125300 A1 | 5/2008 | Cheich et al. | |
| 2008/0153685 A1 | 6/2008 | Cheich et al. | |
| 2008/0207421 A1 | 8/2008 | Wetsch | |
| 2008/0261794 A1 | 10/2008 | Slovencik | |
| 2009/0026306 A1 | 1/2009 | Kempste et al. | |
| 2009/0231123 A1 | 9/2009 | Rowell et al. | |
| 2009/0258775 A1 | 10/2009 | Chan et al. | |
| 2009/0325773 A1 | 12/2009 | Cheich et al. | |
| 2010/0029456 A1 | 2/2010 | Cheich | |
| 2010/0127112 A1 | 5/2010 | Aquarius | |
| 2010/0132529 A1 | 6/2010 | Miyazaki | |
| 2010/0160132 A1 | 6/2010 | Cheich et al. | |
| 2010/0311558 A1 | 12/2010 | Cheich et al. | |
| 2011/0052875 A1 | 3/2011 | Wetsch et al. | |
| 2011/0053750 A1 | 3/2011 | Wetsch et al. | |
| 2011/0218089 A1 | 9/2011 | Demers et al. | |
| 2012/0015793 A1 | 1/2012 | van der Kaap | |
| 2012/0035038 A1 | 2/2012 | Lembach et al. | |
| 2012/0165172 A1 | 6/2012 | Wetsch et al. | |
| 2012/0225765 A1 | 9/2012 | Cheich et al. | |
| 2012/0252648 A1 | 10/2012 | Cheich | |
| 2012/0283084 A1 | 11/2012 | Cheich et al. | |
| 2012/0329629 A1 | 12/2012 | Wetsch et al. | |
| 2013/0092716 A1 | 4/2013 | Wetsch et al. | |
| 2013/0216788 A1 | 8/2013 | Schellenberger | |
| 2013/0237398 A1 | 9/2013 | Lintala et al. | |
| 2013/0313277 A1 | 11/2013 | Stewartson et al. | |
| 2014/0038805 A1 | 2/2014 | Wetsch et al. | |
| 2014/0110423 A1 | 4/2014 | Rapala | |
| 2014/0155241 A1 | 6/2014 | Cheich et al. | |
| 2014/0200127 A1 | 7/2014 | Arora et al. | |
| 2014/0274645 A1 | 9/2014 | Wetsch et al. | |
| 2014/0274647 A1 | 9/2014 | Wetsch et al. | |
| 2015/0014205 A1 | 1/2015 | Yap et al. | |
| 2016/0082685 A1 | 3/2016 | Chan | |
| 2017/0087791 A1 | 3/2017 | Lintala | |
| 2017/0095991 A1* | 4/2017 | Wetsch | B31D 5/0039 |

FOREIGN PATENT DOCUMENTS

| | | |
|---|---|---|
| EP | 1026113 A2 | 8/2000 |
| FR | 2667854 | 4/1992 |
| FR | 2808726 A1 | 11/2001 |
| GB | 2173141 A | 10/1986 |

(56) References Cited

FOREIGN PATENT DOCUMENTS

| | | |
|---|---|---|
| JP | 11-286357 | 10/1999 |
| WO | 94/25380 A1 | 11/1994 |
| WO | 2004039571 A2 | 5/2004 |
| WO | 2011091414 A2 | 7/2011 |
| WO | 2011100078 A2 | 8/2011 |
| WO | 2012067987 A2 | 5/2012 |
| WO | 2012096756 A1 | 7/2012 |
| WO | 2012112215 A1 | 8/2012 |
| WO | 2015061635 A1 | 4/2015 |

OTHER PUBLICATIONS

International Search Report and Written Opinion, dated Jan. 24, 2019 for International Application No. PCT/US2018/032352, filed May 11, 2018.

* cited by examiner

FANFOLD SUPPLY CART

TECHNICAL FIELD

This invention is in the field of protective packaging systems and materials, particularly storage and dispensing devices for fanfold material used in the protective packaging systems.

BACKGROUND

In the context of paper-based protective packaging, paper sheet is crumpled to produce dunnage. Most commonly, this type of dunnage is created by running a generally continuous strip of paper into a dunnage conversion machine that converts a compact supply of stock material, such as a roll of paper or a fanfold stack of paper, into a lower density dunnage material. The supply of stock material, such as in the case of fanfold paper, is pulled into the conversion machine from a stack that is either continuously formed or formed with discrete section connected together. The continuous strip of crumpled sheet material may be cut into desired lengths to effectively fill void space within a container holding a product. The dunnage material may be produced on an as-needed basis for a packer. With the continuous production of the dunnage material, stocking of fanfold material for dispensing through a dunnage machine is a continuous task. This continuous operation results in a need to continuously restock the stock material supply. Restocking the material supply risks the material falling out. Restocking the material supply also involves aligning the dunnage machine and the supply cart.

SUMMARY

In accordance with various embodiments a dunnage system is provided herein. The dunnage system may include a dunnage machine having a stand having a stand base with a low-friction device configured to allow the stand to move relative to the ground. The dunnage system may also include a stock material supply cart for supporting stock material. The stock material supply cart may include a base that supports the stock material and a low-friction device configured to allow the base to move relative to the ground. At least one of the stand base or the stock material supply cart base may include an alignment device defined by two converging docking members forming a funnel thereon. The alignment device may be configured to receive the stand base or the stock material supply cart base not having the alignment device causing the stand and the stock material supply cart to consistently align together in response one of the stand base or the stock material supply cart base being received into the other.

The alignment device may be positioned on the stock material supply cart base. The two converging docking members may include two opposing flanges extending from the bottom of the base. The opposing flanges may be angled with respect to one another. The opposing flanges may have a narrow side and a wide side. The narrow side may include flange ends that are closest to one another and the wide side includes flange ends that are farther from each other. The alignment device receives the stand base on the narrow side such that the flanges pass between casters on the stand base, and as the dunnage machine and the supply cart move toward one another, the flanges and the casters are positioned in closer proximity to one another. The alignment device may be configured such that the flanges contact a portion of the dunnage machine base once the supply cart and dunnage machine are properly positioned relative to one another. The contact limits the supply cart and the dunnage machine from moving further toward one another and limits transverse movement relative to one another. The supply cart includes a gap between the wide end of the flanges and the at least one of the one or more low-friction devices that is sufficient to receive a support member of the stand base.

In accordance with various embodiments a fanfold stock material supply cart. The fanfold stock material supply cart includes a bottom support, opposing vertical side supports, and a biased support. The opposing vertical side supports extend from the bottom support. The opposing vertical side supports define a storage volume that retains the fanfold stock material supply. The opposing vertical side supports retain the fanfold stock material in the transverse directions. The biased support is connected to at least one of the opposing vertical side supports and is movable from an open position to a closed position with respect to the opposing vertical side supports such that in the closed position. The biased support may be configured to at least partially block the opening between the opposing vertical side supports, and in the open position the biased support leaves the opening between the opposing vertical side supports sufficiently open to load fanfold stock material therein. The biased support is biased toward the closed position.

The biased support may be biased in both the closed and open positions. The biased support may extend substantially the entire height of the storage volume. The opposing vertical side supports may be fixed relative to the bottom support. The bias in the closed position and the open position is caused by gravity as the biased support raises then lowers as the biased support travels from the first position to the second position. The biased support may include at least one of a track or a follower. The biased support moves in a nonlinear path from the open position to the closed position. The non-linear path may be defined by a track that is configured to bias the biased support in the open and closed positions. The non-linear path may be concaved upwards. The track may receive a stud on an adjacent wall. The cart may include a second biased support that moves in the same plane as the first biased support. The first biased support retains a first transverse end of the fanfold material and the second biased support retains a second transverse end of the fanfold material. The first biased support and the second biased support have a gap there between that is suitable in size to allow a user to access and daisy-chain the stock material together.

BRIEF DESCRIPTION OF THE DRAWINGS

The drawing figures depict one or more implementations in accordance with the present concepts, by way of example only, not by way of limitations. In the figures, like reference numerals refer to the same or similar elements.

DETAILED DESCRIPTION

A system and apparatus for converting a stock material into dunnage is disclosed. The present disclosure is generally applicable to systems and apparatus where supply material, such as a stock material, is processed. The stock material is processed by longitudinal crumple machines that form creases longitudinally in the stock material to form dunnage or by cross crimple machines that forms creases transversely across the stock material. The stock material may be stored in a roll (whether drawn from inside or outside the roll), a wind, a fan-folded source, or any other suitable form. The stock material may be continuous or perforated. The conversion apparatus is operable to drive the stock material in a first direction, which can be a anti-run out direction. The conversion apparatus is fed the stock material from the repository through a drum in a anti-run out direction. The stock material can be any suitable type of protective packaging material including for example other dunnage and void fill materials, inflatable packaging pillows, etc. Some embodiments use supplies of other paper or fiber-based materials in sheet form, and some embodiments use supplies of wound fiber material such as ropes or thread, and thermoplastic materials such as a web of plastic material usable to form pillow packaging material. Examples of paper used include 30 pound kraft paper, although other styles or weights may be used. The paper may be fan folded stock sheets with 30 inch transverse widths and/or 15 inch transverse widths. Preferably these sheets are fan folded as single layers. In other embodiments, the multiple layers of sheets can be fan folded together such that dunnage is made of superimposed sheets that get crumpled together.

The conversion apparatus is used with a cutting mechanism operable to sever the dunnage material. More particularly, the conversion apparatus including a mechanism for cutting or assisting the cutting of the dunnage material at desired lengths is disclosed. In some embodiments, the cutting mechanism is used with no or limited user interaction. For example, the cutting mechanism punctures, cuts, or severs the dunnage material without the user touching the dunnage material or with only minor contact of the dunnage material by the user. Specifically, a biasing member is used to bias the dunnage material against or around a cutting member to improve the ability of the system to sever the dunnage material. The biased position of the dunnage material is used in connection with or separately from other cutting features such as reversing the direction of travel of the dunnage material.

With reference to FIGS. 1A, 1B, 1C, and 2 a dunnage conversion system 10 is disclosed. The dunnage conversion system 10 may include one or more of a supply of stock material 19 and a dunnage apparatus 50. The dunnage apparatus 50 may include one or more of a supply station 13 and a dunnage conversion machine 100. The dunnage conversion machine 100 may include one or more of a converting station 60, a drive mechanism 250, and a support 12. Generally the dunnage conversion system is operable for processing the stock material 19. In accordance with various embodiments, the converting station 60 includes an intake 70 that receives the stock material 19 from a supply station 13. The drive mechanism 250 is able to pull or assist in pulling the stock material 19 into the intake 70. In some embodiments, the stock material 19 engages an intake bar 200 prior to the intake 70. The intake bar 200 may include a shaping member 210 suitable to cause the stock material 19 to begin curving before entering the intake 70. The drive mechanism 250, in conjunction with edge 112, assists a user in cutting or severing dunnage material 21 at a desired point. The dunnage material 21 is converted from stock material 19, which is itself delivered from a bulk material supply 61 and delivered to the conversion station for converting to dunnage material 21 and then through the drive mechanism 250 and the cutting edge 112.

Figure 1A:
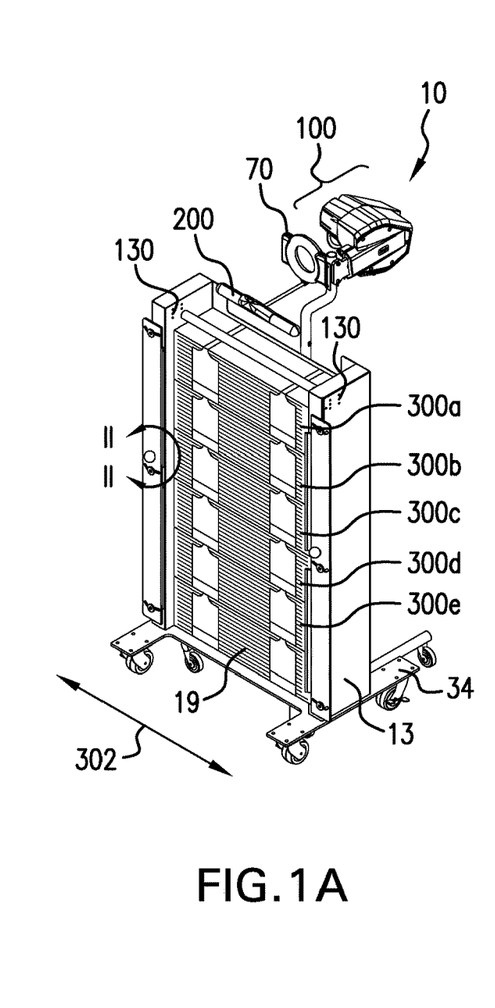
FIG. 1A is a perspective view of an embodiment of a dunnage conversion system.
Figure 1B:
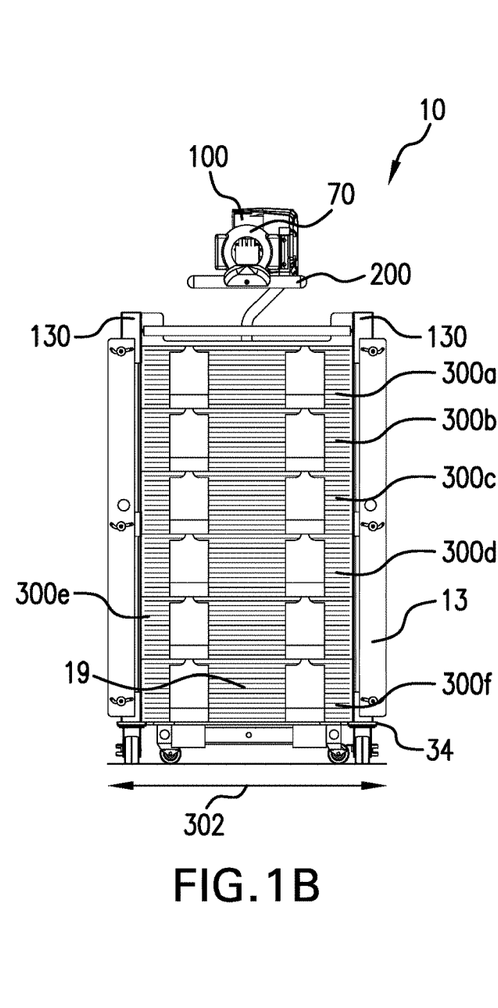
FIG. 1B is a rear view of the embodiment of FIG. 1A of the dunnage conversion system.

In accordance with various examples, as shown in FIGS. 1A and 1B, the stock material 19 is allocated from a bulk supply shown as multiple units of stock material 300a-e. The stock material 19 can be stored as stacked bales of fan-fold material. However, as indicated above, any other suitable type of supply or stock material may be used. The stock material 19 can be contained in the supply station 13. In one example, the supply station 13 is a cart 34 movable relative to the dunnage conversion system 10. The cart 34 includes side walls 140a, 140b. The side walls can define 140a, 140b a magazine 130 suitable to contain multiple units of stock material 300 that the stock material 19 can be pulled from. In other examples, the supply station 13 is not moveable relative to the dunnage conversion system 10. For example, the supply station 13 may be a single magazine, basket, or other container mounted to or near the dunnage conversion system 10.

The stock material 19 is fed from the supply side 61 through the intake 70. The stock material 19 begins being converted from dense stock material 19 to less dense dunnage material 21 by the intake 70 and then pulled through the drive mechanism 250 and dispensed in a anti-run out direction A on the out-feed side 62 of the intake 70. The material can be further converted by the drive mechanism 250 by allowing rollers or similar internal members to crumple, fold, flatten, or perform other similar methods that further tighten the folds, creases, crumples, or other three dimension structure created by intake 70 into a more permanent shape creating the low-density configuration of dunnage material. The stock material 19 can include continuous (e.g. continuously connected stacks, rolls, or sheets of stock material), semi-continuous (e.g. separated stacks or rolls of stock material), or non-continuous (e.g. single discrete or short lengths of stock material) stock material 19 allowing for continuous, semi-continuous or non continuous feeds into the dunnage conversion system 10. Multiple lengths can be daisy-chained together. Further, it is appreciated that various structures of the intake 70 on longitudinal crumpling machines can be used, such as those intakes forming a part of the converting stations disclosed in U.S. Pat. Pub. No. 2013/0092716, U.S. Publication 2012/0165172, U.S. Publication No 2011/0052875, and U.S. Pat. No. 8,016,735. Examples of cross crumpling machines include U.S. Pat. No. 8,900,111.

In one configuration, the dunnage conversion system 10 can include a support portion 12 for supporting the station. In one example, the support portion 12 includes an inlet guide 70 for guiding the sheet material into the dunnage conversion system 10. The support portion 12 and the inlet guide 70 are shown with the inlet guide 70 extending from the post. In other embodiments, the inlet guide may be combined into a single rolled or bent elongated element forming a part of the support pole or post. The elongated element extends from a floor base configured to provide lateral stability to the converting station. In one configuration, the inlet guide 70 is a tubular member that also functions as a support member for supporting, crumpling and guiding the stock material 19 toward the drive mechanism 250. Other inlet guide designs such as spindles may be used as well.

In accordance with various embodiments, the advancement mechanism is an electromechanical drive such as an electric motor 11 or similar motive device. The motor 11 is connected to a power source, such as an outlet via a power cord, and is arranged and configured for driving the dunnage conversion system 10. The motor 11 is an electric motor in which the operation is controlled by a user of the system, for example, by a foot pedal, a switch, a button, or the like. In various embodiments, the motor 11 is part of a drive portion, and the drive portion includes a transmission for transferring power from the motor 11. Alternatively, a direct drive can be used. The motor 11 is arranged in a housing and is secured to a first side of the central housing, and a transmission is contained within the central housing and operably connected to a drive shaft of the motor 11 and a drive portion, thereby transferring motor 11 power. Other suitable powering arrangements can be used.

Figure 1C:
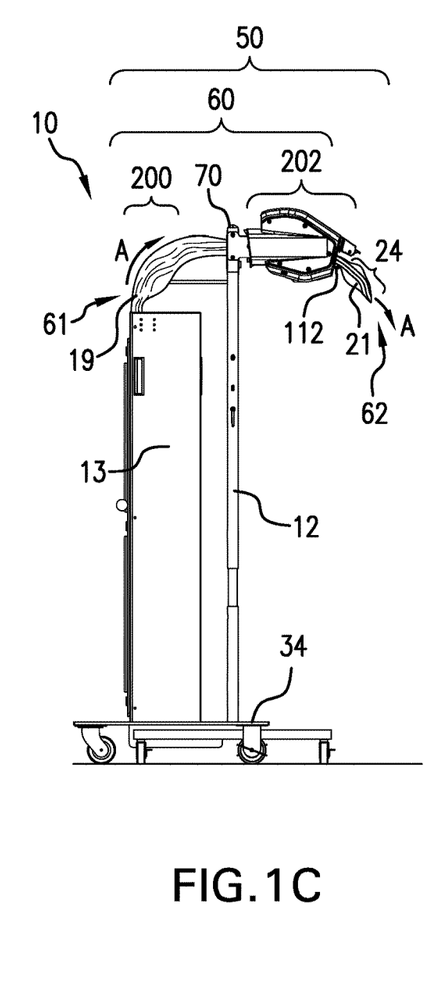
FIG. 1C is a side view of the embodiment of FIG. 1A of the dunnage conversion system.
Figure 2:
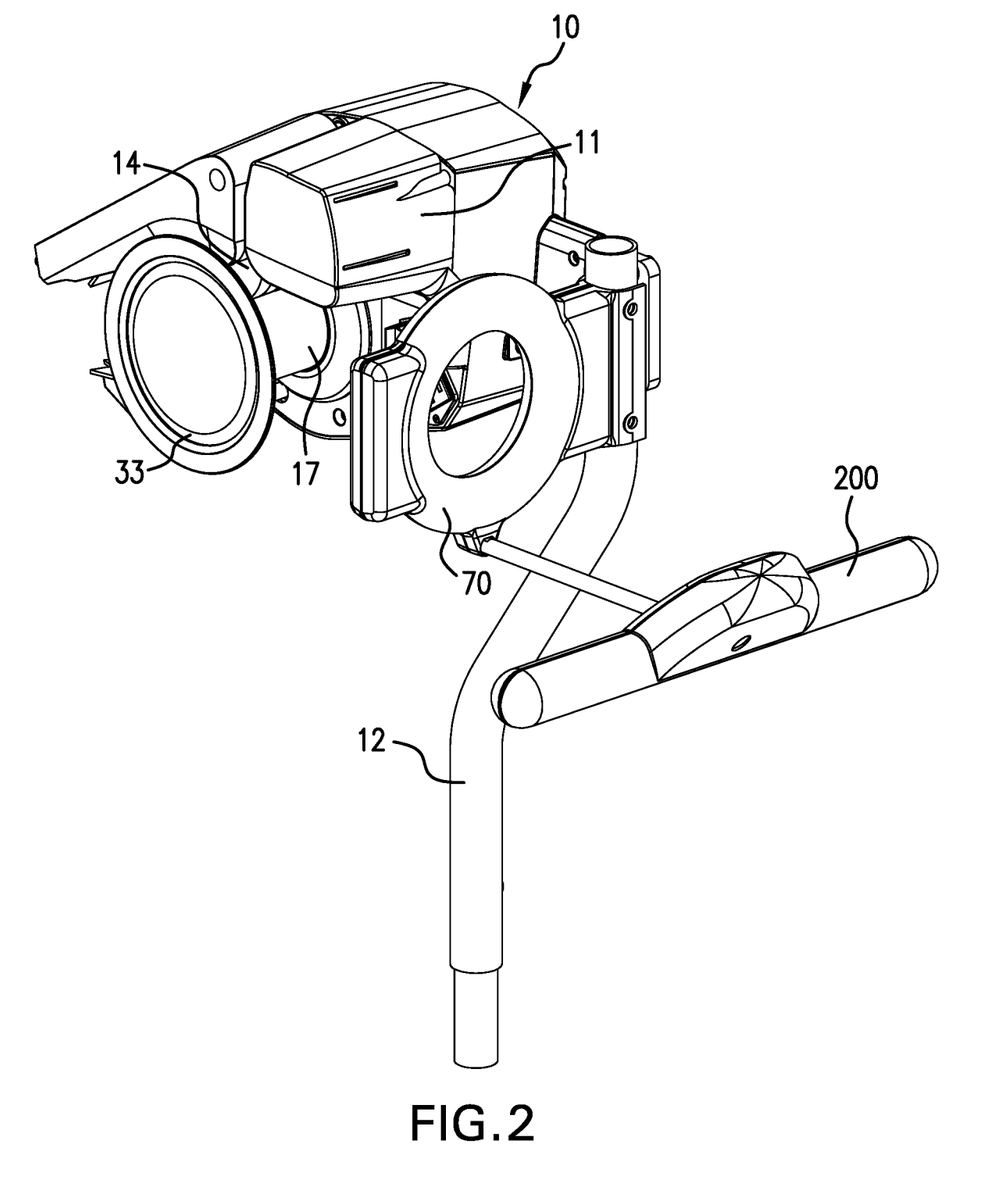
FIG. 2 is a perspective view of part of the embodiment of the dunnage conversion machine of FIG. 1A.

The motor 11 is mechanically connected either directly or via a transmission to a drum 17, shown in FIG. 2, which causes the drum 17 to rotate with the motor 11. During operation, the motor 11 drives the drum 17 in either a anti-run out direction or a reverse direction (i.e., opposite of the anti-run out direction), which causes drum 17 to dispense the dunnage material 21 by driving it in the anti-run out direction, depicted as arrows "A" in FIGS. 1C and 2, or withdraw the dunnage material 21 back into the conversion machine in the direction opposite of A. The stock material 19 is fed from the supply side 61 of the intake 70 and over the drum 17, forming the dunnage material 21 that is driven in the anti-run out direction "A" when the motor 11 is in operation. While described herein as a drum, this element of the driving mechanism may also be wheels, conveyors, belts or any other suitable device operable to advance stock material or dunnage material through the system.

In accordance with various embodiments, the dunnage conversion system 10 includes a pinch portion operable to press on the material as it passes through the drive mechanism 250. As an example, the pinch portion includes a pinch member such as a wheel, roller, sled, belt, multiple elements, or other similar member. In one example, the pinch portion includes a pinch wheel 14. The pinch wheel 14 is supported via a bearing or other low friction device positioned on an axis shaft arranged along the axis of the pinch wheel 14. In some embodiments, the pinch wheel can be powered and driven. The pinch wheel 14 is positioned adjacent to the drum such that the material passes between the pinch wheel 14 and the drum 17. In various examples, the pinch wheel 14 has a circumferential pressing surface arranged adjacent to or in tangential contact with the surface of the drum 17. The pinch wheel 14 may have any suitable size, shape, or configuration. Examples of size, shape, and configuration of the pinch wheel may include those described in U.S. Pat. Pub. No. 2013/0092716 for the press wheels. In the examples shown, the pinch wheel 14 is engaged in a position biased against the drum 17 for engaging and crushing the stock material 19 passing between the pinch wheel 14 and the drum 17 to convert the stock material 19 into dunnage material 21. The drum 17 or the pinch wheel 14 is connected to the motor 11 via a transmission (e.g., a belt drive or the like). The motor 11 causes the drum or the pinch wheel to rotate.

In accordance with various embodiments, the drive mechanism 250 may include a guide operable to direct the material as it is passes through the pinch portion. In one example, the guide may be a flange 33 mounted to the drum 17. The flange 33 may have a diameter larger than the drum 17 such that the material is kept on the drum 17 as it passes through the pinch portion.

The drive mechanism 250 controls the incoming dunnage material 19 in any suitable manner to advance it from a conversion device to the cutting member. For example, the pinch wheel 14 is configured to control the incoming stock material. When the high-speed incoming stock material diverges from the longitudinal direction, portions of the stock material contacts an exposed surface of the pinch wheels, which pulls the diverging portion down onto the drum and help crush and crease the resulting bunching material. The dunnage may be formed in accordance with any suitable techniques including ones referenced to herein or ones known such as those disclosed in U.S. Pat. Pub. No. 2013/0092716.

In accordance with various embodiments, the conversion apparatus 10 can be operable to change the direction of the stock material 19 as it moves within the conversion apparatus 10. For example, the stock material is moved by a combination of the motor 11 and drum 17 in a forward direction (i.e., from the inlet side to the anti-run out side) or a reverse direction (i.e., from the anti-run out side to the supply side 61 or direction opposite the anti-run out direction). This ability to change direction allows the drive mechanism 250 to cut the dunnage material more easily by pulling the dunnage material 19 directly against an edge 112. As, the stock material 19 is fed through the system and dunnage material 21 it passes over or near a cutting edge 112 without being cut.

Preferably, the cutting edge 112 can be curved or directed downward so as to provide a guide that deflects the material in the out-feed segment of the path as it exits the system near the cutting edge 112 and potentially around the edge 112. The cutting member 110 can be curved at an angle similar to the curve of the drum 17, but other curvature angles could be used. It should be noted that the cutting member 110 is not limited to cutting the material using a sharp blade, but it can include a member that causes breaking, tearing, slicing, or other methods of severing the dunnage material 21. The cutting member 110 can also be configured to fully or partially sever the dunnage material 21.

In various embodiments, the transverse width of the cutting edge 112 is preferably about at most the width of the drum 17. In other embodiments, the cutting edge 112 can have a width that is less than the width of the drum 17 or greater than the width of the drum 17. In one embodiment, the cutting edge 112 is fixed; however, it is appreciated that in other embodiments, the cutting edge 112 could be moveable or pivotable. The edge 112 is oriented away from the driving portion. The edge 112 is preferably configured sufficient to engage the dunnage material 21 when the dunnage material 21 is drawn in reverse. The edge 112 can comprise a sharp or blunted edge having a toothed or smooth configuration, and in other embodiments, the edge 112 can have a serrated edge with many teeth, an edge with shallow teeth, or other useful configuration. A plurality of teeth are defined by having points separated by troughs positioned there between.

Generally, the dunnage material 21 follows a material path A as shown in FIG. 1C. As discussed above, the material path A has a direction in which the material 19 is moved through the system. The material path A has various segments such as the feed segment from the supply side 61 and severable segment 24. The dunnage material 21 on the out-feed side 62 substantially follows the path A until it reaches the edge 112. The edge 112 provides a cutting location at which the dunnage material 21 is severed. The material path can be bent over the edge 112.

As discussed above, any suitable stock material may be used. For example, the stock material may have a basis weight of about at least 20 lbs., to about, at most, 100 lbs. Examples of paper used include 30 pound kraft paper. The stock material 19 comprises paper stock stored in a high-density configuration having a first longitudinal end and a second longitudinal end that is later converted into a low-density configuration. The stock material 19 is a ribbon of sheet material that is stored in a fan-fold structure, as shown in FIG. 1A, or in coreless rolls. The stock material is formed or stored as single-ply or multiple plies of material. Where multi-ply material is used, a layer can include multiple plies. It is also appreciated that other types of material can be used, such as pulp-based virgin and recycled papers, newsprint, cellulose and starch compositions, and poly or synthetic material, of suitable thickness, weight, and dimensions.

In various embodiments, the stock material units may include an attachment mechanism that may connect multiple units of stock material (e.g., to produce a continuous material feed from multiple discrete stock material units). Preferably, the adhesive portion facilitates daisy-chaining the rolls together to form a continuous stream of sheet material that can be fed into the converting station 70.

Generally, the stock material 19 may be provided as any suitable number of discrete stock material units. In some embodiments, two or more stock material units may be connected together to provide a continuous feed of material into the dunnage conversion machine that feeds through the connected units, sequentially or concurrently (i.e., in series or in parallel). Moreover, as described above, the stock material units may have any number of suitable sizes and configurations and may include any number of suitable sheet materials. Generally, the term "sheet material" refers to a material that is generally sheet-like and two-dimensional (e.g., where two dimensions of the material are substantially greater than the third dimension, such that the third dimension is negligible or de minimus in comparison to the other two dimensions). Moreover, the sheet material is generally flexible and foldable, such as the example materials described herein.

In some embodiments, the stock material units may have fanfold configurations. For example, a foldable material, such as paper, may be folded repeatedly to form a stack or a three-dimensional body. The term "three-dimensional body," in contrast to the "two-dimensional" material, has three dimensions all of which are non-negligible. In an embodiment, a continuous sheet (e.g., sheet of paper, plastic, or foil) may be folded at multiple fold lines that extend transversely to a longitudinal direction of the continuous sheet or transversely to the feed direction of the sheet. For example, folding a continuous sheet that has a substantially uniform width along transverse fold lines (e.g., fold lines oriented perpendicularly relative to the longitudinal direction) may form or define sheet sections that have approximately the same width. In an embodiment, the continuous sheet may be folded sequentially in opposite or alternating directions to produce an accordion-shaped continuous sheet. For example, folds may form or define sections along the continuous sheet, which may be substantially rectangular.

For example, sequentially folding the continuous sheet may produce an accordion-shaped continuous sheet with sheet sections that have approximately the same size and/or shape as one another. In some embodiments, multiple adjacent section that are defined by the fold lines may be generally rectangular and may have the same first dimension (e.g., corresponding to the width of the continuous sheet) and the same second dimension that is generally along longitudinal direction of the continuous sheet. For example, when the adjacent sections are contacting one another, the continuous sheet may be configured as a three-dimensional body or a stack (e.g., the accordion shape that is formed by the folds may be compressed, such that the continuous sheet forms a three-dimensional body or stack).

It should be appreciated that the fold lines may have any suitable orientation relative to one another as well as relative to the longitudinal and transverse directions of the continuous sheet. Moreover, the stock material unit may have transverse folds that are parallel one to another (e.g., compressing together the sections that are formed by the fold lines may form a three-dimensional body that is rectangular prismoid) and may also have one or more folds that are non-parallel relative to the transverse folds.

Folding the continuous sheet at the transverse fold lines forms or defines generally rectangular sheet sections. The rectangular sheet sections may stack together (e.g., by folding the continuous sheet in alternating directions) to form the three-dimensional body that has longitudinal, transverse, and vertical dimensions. As described above, the stock material from the stock material units may be fed through the intake 70 (FIGS. 1A, 1B, and 2). In some embodiments, the transverse direction of the continuous sheet (e.g., direction corresponding to the transverse dimension 302 is greater than one or more dimensions of the intake 70. For example, the transverse dimension of the continuous sheet may be greater than the diameter of a generally round intake. For example, reducing the width of the continuous sheet at the start thereof may facilitate passage thereof into the intake. In some embodiments, the decreased width of the leading portion of the continuous sheet may facilitate smoother entry and/or transition or entry of a daisy-chained continuous sheet and/or may reduce or eliminate catching or tearing of the continuous sheet. Moreover, reducing the width of the continuous sheet at the start thereof may facilitate connecting together or daisy-chaining two or more stock material units. For example, connecting or daisy-chaining material with a tapered section may require smaller connectors or splice elements than for connecting a comparable sheet of full width. Moreover, tapered sections may be easier to manually align and/or connect together than full-width sheet sections.

Figure 4A:
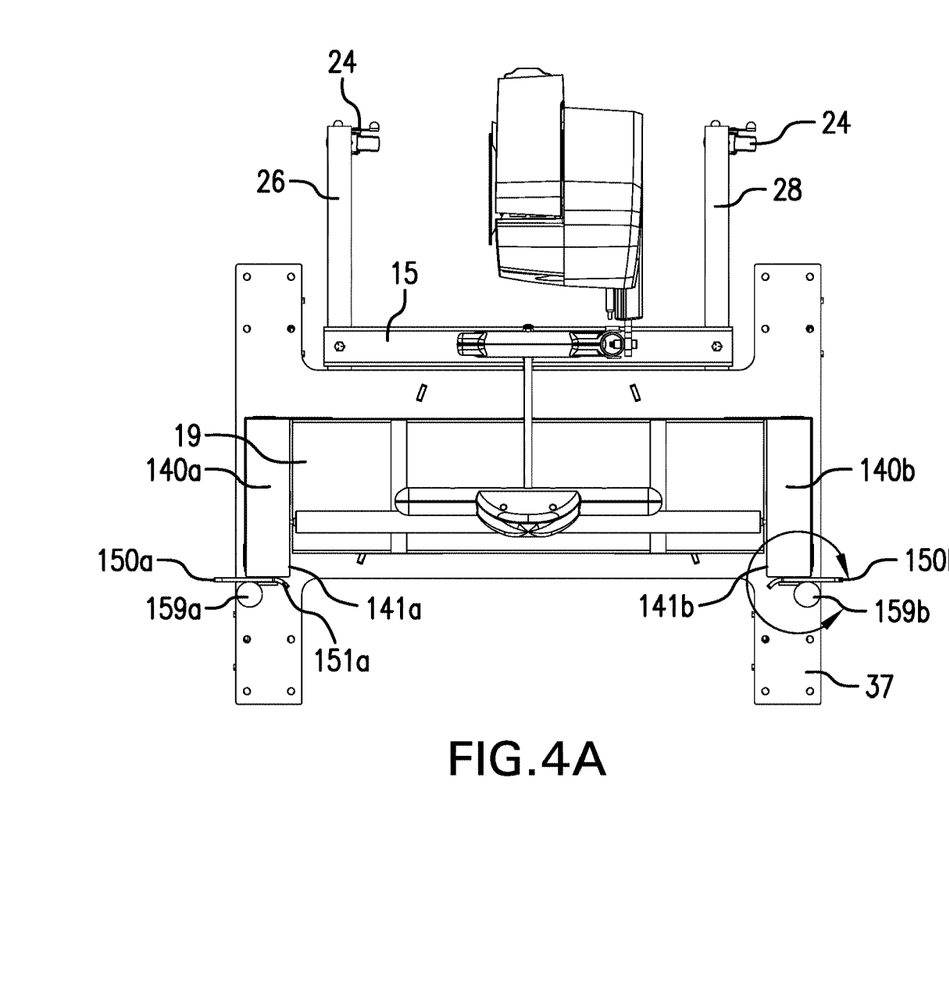
FIG. 4A is a top view of the cart and dunnage conversion machine of FIG. 1A.
Figure 4B:
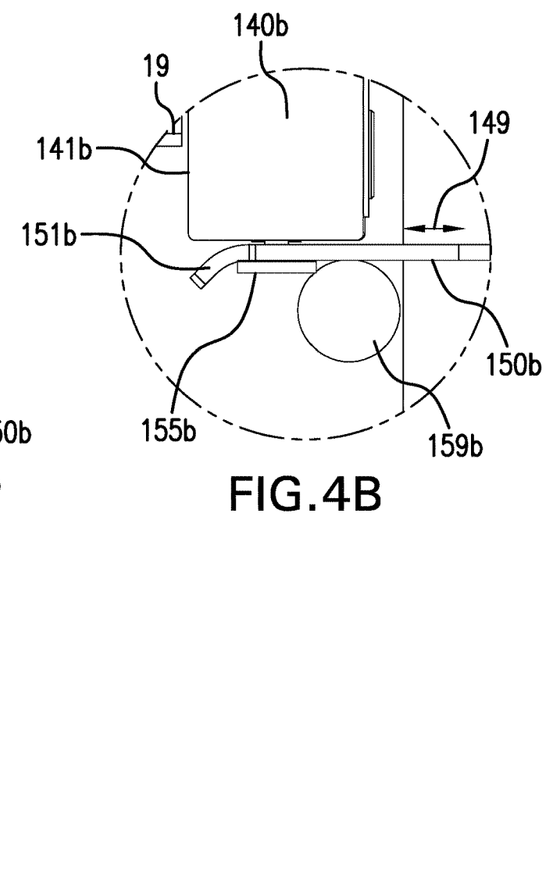
FIG. 4B is a detailed view of detail I-I taken from FIG. 4A.

As described above, the dunnage conversion machine may include a supply station (e.g., supply station 13 (FIGS. 1A-1C)). In accordance with various embodiments, the supply station 13 is any structure suitable to support the stock material 19 and allow the material to be drawn into the intake 70. As illustrated in FIGS. 1A-6B, the supply station 13 is a cart 34 that is separately movable relative to the dunnage conversion machine 100. In various other examples, as illustrated in FIGS. 4A-4B, the supply station 13 is mounted to the dunnage conversion machine 100. The supply station may support the stock material 19 in one or more unites. FIGS. 1A-C illustrate the supply station 13 supporting a plurality of stock material units, e.g., units 300a, 300b, 300c, 300d, and/or 300e. It should be noted, however, that support member 220 may support a plurality of units and/or the cart 34 may support a single unit. Each of the stock material units 300a, 300b, 300c, 300d, and/or 300e may be placed into the supply station 13 individually and subsequently may be connected together after placement. Hence, for example, each of the stock material units 300a, 300b, 300c, 300d, and/or 300e may be suitability sized to facilitate lifting and placement thereof by an operator. Moreover, any number of stock material units may be connected or daisy-chained together. For example, connecting together or daisy-chaining multiple stock material units may produce a continuous supply of material.

Figure 3:
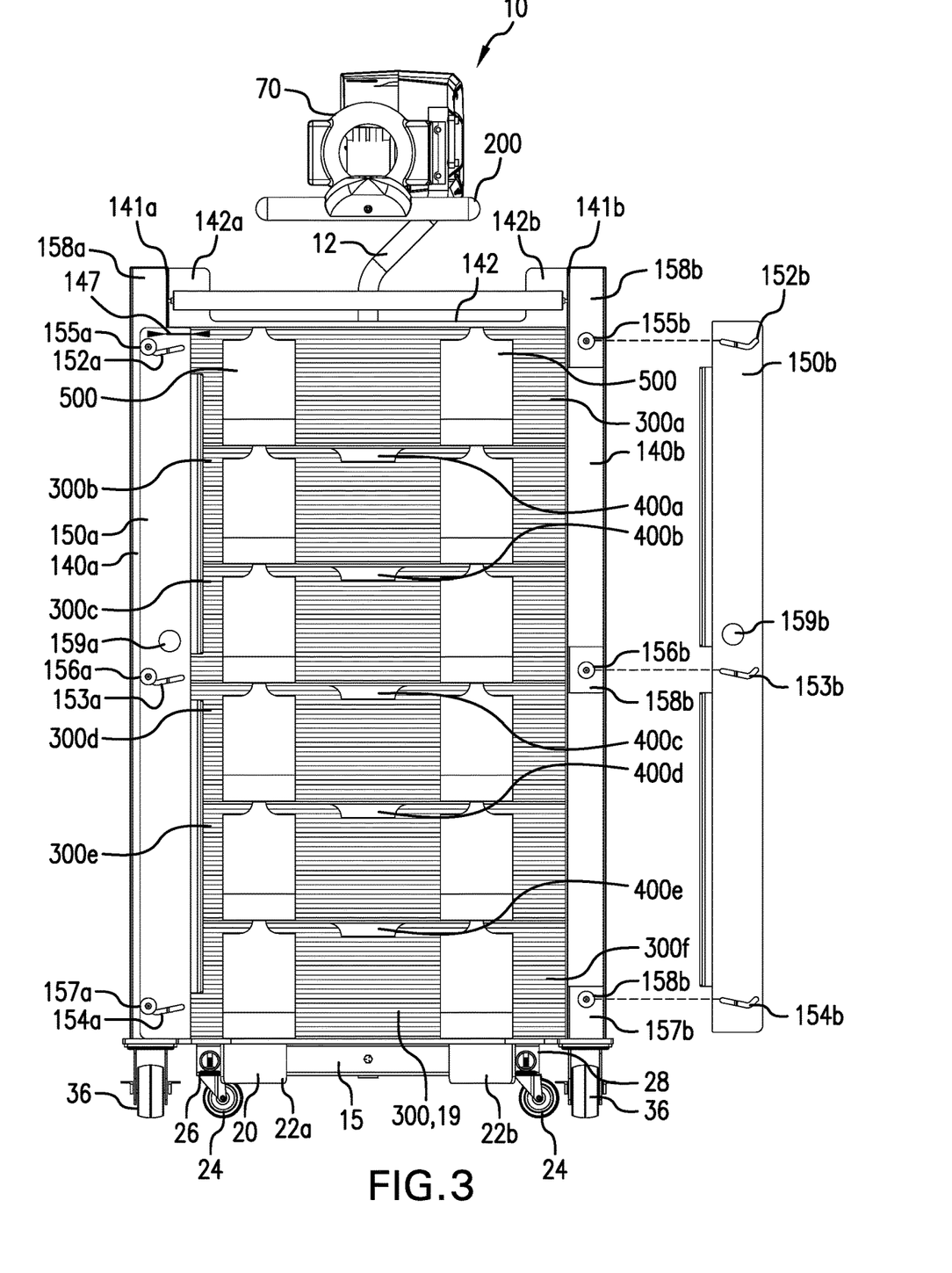
FIG. 3 is a front view of the cart of the dunnage conversion system of FIG. 1A shown with one door closed and one door detached in an exploded view.

In accordance with various embodiments, as shown FIG. 3, the stock supply 13 is a movable storage container. For example, the stock supply 13 may form a part of a cart 34. In this way, the stock supply 13 may move relative to the dunnage conversion machine 100. Either one or both of the stock supply 13 and the dunnage conversion machine 100 can be supported on casters, wheels, gliders, runners, or similar low-friction devices. For example, the stock supply cart 34 includes casters 36 that allow the stock supply cart 34 to be moved toward or away from the dunnage conversion machine 100. The low-friction devices (e.g., casters 36, wheels, sliders, gliders etc.) may be mounted to a base 37 allowing the base 37 to move along the floor. In various examples, the dunnage conversion machine 100 includes a stand 12 that also includes base 15 that may be supported on casters, wheels, gliders, sliders, runners, or similar low-friction devices such as casters 24. This allows the stand 12 to be moved toward or away from cart 34.

In some embodiments, the cart 13 may also include a guide bar 134 that is positioned to redirect the stock material 19 as the stock material 19 is pulled from a unit of stock material (e.g. 300a) and into the drive mechanism 250 of the dunnage machine 100.

In accordance with various embodiments, the cart may also include upright supports suitable to support transverse ends of the stock material 19. In various examples, the upright supports may include generally vertical walls 140a, 140b that extend from the base 37. In various examples, these vertical walls are fixed relative to the base 37.

In some embodiments, the interior surfaces 141a, 141b of the walls 140a, 140b provide the support against the units 300 of stock material 19 discussed above. In other embodiments, the walls 140a, 140b support and/or form other features of the cart 34. For example, as shown in FIGS. 1A-C and 3 the front vertical support/wall 142 and/or the rear supports/walls 150a and 150b may extend from the walls 140a, 140b. The vertical support wall 142 may be contiguous extending between the vertical walls 140a, 140b and/or the vertical support wall 142 may have transverse sections 142a, 142b that limit the movement of the stock material 19 proximal to the transverse ends of the stock material 19. In other embodiments, the front vertical supports/walls 142a, 142b and/or the rear supports/walls 150a and 150b may alternatively or additionally extend from the base 37. In accordance with some embodiments, the generally vertical walls 140a, 140b may be thin walls, tubular walls, or walls with other suitable cross-sections that are sufficient to support the stock material 19 in the transverse directions 302 or support one or more of the front or rear vertical walls such as walls 150a, 150b. In one example, the vertical walls 140 may form a portion of a boxed structure formed from sheet metal, polymer, carbon fiber, composite or other suitable material or combination of materials. In another example, the vertical walls 140a, 140b may be generally vertical tubes that are sufficient to provide transverse support to the stock material 19. Front and/or rear walls may still extend from the vertical tubes or the base.

In accordance with various embodiments, the front 142a, 142b and/or rear walls 150a, 150b may be suitable to limit or prevent the stock material units 300 from being inserted into or removed from the cart 34. This includes limiting the units 300 from tipping or falling out of the cart 34. It may also be appreciated that the cart 34 is periodically refilled with units of stock material 300. In order to do this, either the front or rear walls are removed or are sufficiently adjustable to allow the stock material units 300 to be loaded into the cart 34. For example, one or more sets of the vertical supports/walls may be adjustable such that they open and close. In a particular example, as shown in FIGS. 1A-5B, the rear supports/walls 150a and 150b are movable.

In accordance with various embodiments, cart 34 includes at least one wall portion (e.g. 150a or 150b) that moves such that in one position it has an overlap 147 with the stock material 19 such that the wall portion limits the stock material from falling out and in a second position there is no overlap with the stock material 19, allowing stock material to be removed or loaded onto the cart 34. In one example, the wall movement is generally horizontal in the general direction 149 shown in FIG. 4B. In other embodiments, the door may swing, pivot, or drop out of the way of the overlap with the stock material 19.

Figure 5A:
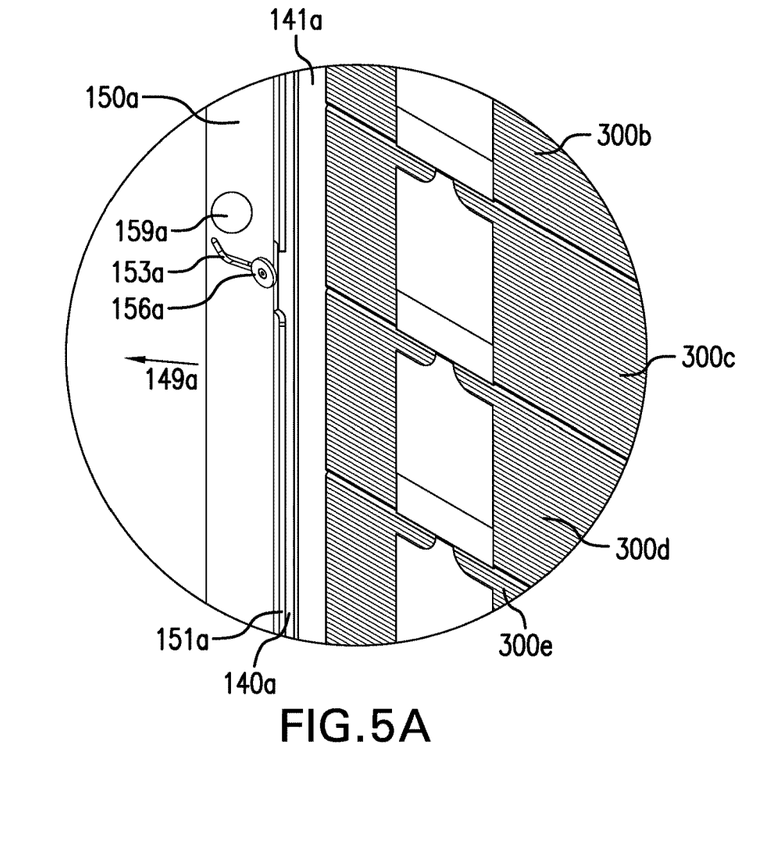
FIG. 5A is a detailed view of detail II-II taken from FIG. 1A with the wall portion in an open position.
Figure 5B:
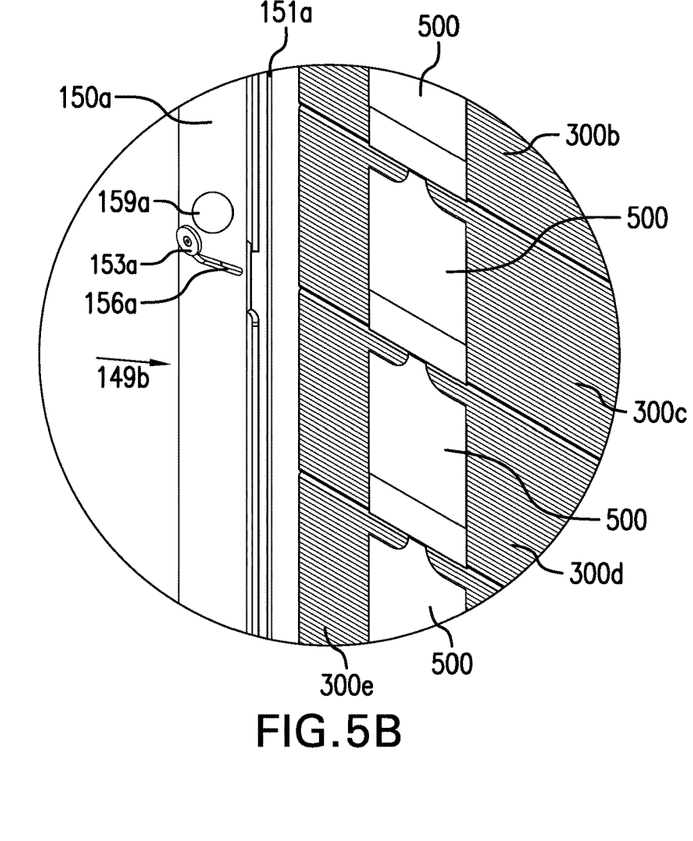
FIG. 5B is a detailed view of detail II-II taken from FIG. 1A with the wall portion in a closed position.

As indicated above, the cart 34 includes at least one wall portion (e.g. 150a or 150b). However, in a preferred embodiment the cart 34 includes two wall portions 150a and 150b that oppose one another. The two wall portions 150a and 150b overlap with each of the transverse ends of the stock material units 300, preventing or limiting them from falling out of the cart, being removed from the cart, or being loaded into the cart while in a closed position. The remaining embodiments discussed herein will refer to this embodiment having opposing wall portions, while understanding fully that each of the embodiments may also function and be utilized with a single wall portion. In accordance with various embodiments, the wall portions 150a and 150b are respectively attached to vertical walls 140a and 140b via a sliding mechanism. In one example, the sliding mechanism is a biased sliding mechanism that limits movement of the wall portions 150a and 150b when in at least one of the open and closed positions but preferably in both the open and closed positions. In one example, the sliding mechanism includes a track (e.g. 152a) and a follower (e.g. 155a) for the track. Either the track or the follower can be stationary, and in reverse either the tack or the follower can be in movement. In the example as shown in FIGS. 5A and 5B, the track 153a is located in the wall 150a and the follower 156a extends through the track and is connected to the wall 140a. In this example, the follower 156a is stationary and formed of any suitable hardware capable of engaging with and guiding the track 153a. Such hardware can include standoffs, rollers, etc. Preferably, the standoff includes a head that is wider than the track such that the standoff head holds the wall (e.g. 150a) onto the adjacent wall (e.g. 140a). Preferably, the interaction between the track and the standoff is such that the friction between the two is minimal, allowing for the wall to easily slide there between.

In accordance with various embodiments, the bias mechanism biases the wall portions 150a and 150b in both the open position and the closed position. In one example, the track portion has ends that are at a different height than the middle portion of the track. This forms a non-linear path in the track. When the track is located on wall portions 150*a* and 150*b*, the ends are higher than the middle (i.e. concave upward). When the track is located on wall 140*a* and 140*b*, the ends are lower than the middle (i.e. concave downward). The wall portions 150*a* and 150*b* are pulled downwardly by gravity, and as such under either of these configurations of the track, the follower (e.g. standoff 156 as shown in FIG. 5A and FIG. 5B) is biased to the end portion of the track (e.g. 153*a* as shown in FIG. 5A and FIG. 5B). Thus, to move the wall portions from open to closed, a user lifts the wall portions while sliding in the direction of 149*b* (see FIG. 5B). While moving the wall portions from closed to open, a user lifts the wall portions while sliding in the direction of 149*a* (see FIG. 5A). In various embodiments, a grip 159*a* is provided to allow a user to manipulate the wall portions in both the vertical (e.g. lifting to overcome the biased position) and horizontal directions (e.g. to open or close). In one example, the grip 159*a* is a knob that protrudes from the wall portions, but other devices suitable for manipulating the wall portions can be used as well, including other types of handles that protrude or recess into the wall portions. Preferably, the grip 159*a* is located proximal to the middle of each of the wall portions 150*a* and 150*b*.

As discussed above, the cart 34 is suitable to hold multiple units of stock material. These units of stock material may extend a partial way up the height of the cart 34 or approximately the entire height of the cart 34. To limit movement of all of the units of stock material (e.g. 300*a-f*), the door preferably extends approximately the entire height of the stock material storage area of the cart 34. For purposes herein, approximately the entire height of the storage area relates to a sufficient height such that if the storage area of the cart 34 is fully loaded with units of stock material, then the wall portions 150*a* and 150*b* would overlap at least a portion of all of the units of stock material loaded therein.

As the wall portions 150*a* and 150*b* may have a significant height as discussed above, each of the wall portions may include multiple biased sliding mechanisms. For example, wall portion 150*a* may include a track 152*a* near the top end of the wall portion, a track 153*a* near the middle portion of the wall portion, and a track 154*a* near the bottom portion of the wall portion. Correspondingly, the vertical wall 140*a* can include a follower 155*a* near the top end of the wall, a follower 155*a* near the middle portion of the wall portion, and a follower 155*a* near the bottom portion of the wall portion. Similarly, the wall portion 150*b* may include a track 152*b* near the top end of the wall portion, a track 153*b* near the middle portion of the wall portion, and a track 154*b* near the bottom portion of the wall portion. Correspondingly, the vertical wall 140*b* can include a follower 155*b* near the top end of the wall, a follower 155*b* near the middle portion of the wall portion, and a follower 155*b* near the bottom portion of the wall portion.

As the wall portions 150*a* and 150*b* slide relative to the vertical walls 140*a* and 140*b*, an issue of friction can arise between the two surfaces. As such, a friction reducer (e.g. 158*a*) can be located between the two surfaces. The friction reducer can be a low friction material, a lubricant, or another item sufficient to reduce the friction between the wall portions 150*a* and 150*b* to slide relative to the vertical walls 140*a* and 140*b*. In one example, the fiction reducer can be a second material that the wall portions 150*a* and 150*b* ride on such as polytetrafluoroethylene, acetal, or similar low friction materials. The friction reducer can form a part of the sliding mechanism, and as such can be located proximal to each of the standoffs or the tracks discussed above. Alternatively, they can be located elsewhere along the vertical walls or the wall portions. In one example, a friction reducer 158*a* is located proximal to each of the followers on the wall 140*a* and a friction reducer 158*b* is located proximal to each of the followers on the wall 140*b*.

As the stock material 19 is loaded on and off of the cart 34, the stock material 19 may not be aligned perfectly and may therefore interfere with the closing of the wall portions 140*a* and 140*b*. To mitigate this interference, each of the wall portions may include a ramped edge 151*a* and 151*b* as variously shown in FIGS. 4A-5B. The ramped edge is located on the leading side of the wall portions 150*a* and 150*b* or, stated another way, the side of the wall portion that is directed toward the stock material 19 and the middle of the cart 34 as opposed to the outside of the cart 34. The ramped edge 151*a* and 151*b* may also be directed rearwardly away from the paper so that as the wall portions 150*a* and 150*b* slide toward and over the stock material 19, the very leading tip of the ramped edges 151*a* and 151*b* clears the paper, allowing the rest of the body of the wall portions 150*a* and 150*b* to continue sliding and potentially forcing the stock material 19 into alignment within the cart 34.

As discussed above, the wall portions 150*a* and 150*b* may oppose each other such that they overlap with the transverse ends of the stock material. In some embodiments, the overlap 147 may be so substantial that there is little to no space between the wall portions 150*a* and 150*b* proximal to the middle of the cart 34. In other embodiments, the overlap 147 is sufficiently minor so that only the transverse edges are blocked, leaving open a significant space between the opposing wall portions 150*a* and 150*b*. This space may be significant enough to remove the strap assemblies 500 discussed in more detail below. This space may be significant enough to splice together the units of stock material, also discussed in more detail below.

As described above, the dunnage conversion machine may include a supply station (e.g., supply station 13 (FIGS. 1A-2)). For example, each of the stock material units 300*a* may be placed into the supply station individually and subsequently may be connected together after placement. Hence, for example, each of the stock material units 300*a*-300*f* may be suitably sized to facilitate lifting and placement thereof by an operator. Moreover, any number of stock material units may be connected or daisy-chained together. For example, connecting together or daisy-chaining multiple stock material units may produce a continuous supply of material.

As described above, the stock material unit may include a continuous sheet that may be repeatedly folded to form or define a three-dimensional body or stack of the stock material unit. Except as described herein, the stock material unit 300*c* may be similar to the stock material unit 300*b*, which may be similar to the stock material unit 300*a*, and so on. For example, a continuous sheet may be repeatedly folded in opposing directions along transverse fold lines to form sections or faces along the longitudinal direction of the continuous sheet such that adjacent sections may fold together (e.g., accordion-like) to form the three-dimensional body of each of the stock material units 300.

The stock material units may include one or more straps that may secure the folded continuous sheet (e.g., to prevent unfolding or expansion and/or to maintain the three-dimensional shape thereof). For example, strap assemblies 500 may wrap around the three-dimensional body of the stock material unit, thereby securing together the multiple layers or sections (e.g., formed by accordion-like folds). The strap assemblies 500 may facilitate storage and/or transfer of the stock material unit (e.g., by maintaining the continuous sheet in the folded and/or compressed configuration). Units 300a-f include the strap assemblies 500 removed.

For example, when the stock material unit 300 is stored and/or transported, wrapping the three-dimensional body of the stock material unit 300 and/or compressing together the layers or sections of the continuous sheet that defines the three-dimensional body may reduce the size thereof. Moreover, compressing together the sections of the continuous sheet may increase rigidity and/or stiffness of the three-dimensional body and/or may reduce or eliminate damaging the continuous sheet during storage and/or transportation of the stock material unit 300.

Generally, the strap assemblies 500 may be positioned at any number of suitable locations along the transverse dimension of any of the stock material units 300. In the illustrated embodiment, the strap assemblies 500 are positioned on opposite sides of the unit. In some embodiments, another stock material unit may be placed on top of each of the stock material units with 300a shown on top of 300b such that the bottom section and/or portion of the continuous sheet of unit 300a contacts the exposed portion(s) of the stock material unit 300b. Generally, stock material units may be similar to or the same as one another. Moreover, a connector of a splice member that is included with the stock material unit 300a may be attached to the stock material unit 300b. For example, the adhesive layer of the connector that is attached to the stock material unit 300b may face outward or upward.

Moreover, as mentioned above, the stock material unit 300b may be the same as the stock material unit 300a. For example, the stock material unit 300b may include a connector that may be oriented to have an adhesive thereof face upward or outward. Hence, an additional stock material unit may be placed on top of the stock material unit 300b, such as to connect together the continuous sheet of the stock material unit 300b with the continuous sheet of another stock material unit (e.g. unit 300a). In such manner, any suitable number of stock material units may be connected together and/or daisy-chained to provide a continuous feed of stock material into the dunnage conversion machine.

In some embodiments, as discussed in detail above, the stock material unit 300 may be bent or have an arched shape. For example, unit 300e may be bent while unit 300a is flat. In some examples all units are bent. In other examples no units are bent. The stock material units 300a-d include splice members 400a-d. The stock material unit 300a-d may be bent in the manner that protrudes the connector of the splice member 400a outward relative to other portions of the stock material unit 300a-d. The splice member 400a is configured to daisy-chain unit 300a to unit 300b. The splice member 400b is configured to daisy-chain unit 300b to unit 300c. The splice member 400c is configured to daisy-chain unit 300c to unit 300c. The splice member 400d is configured to daisy-chain unit 300d to unit 300e. Stacking or placing another, additional stock material unit on top of the bent stock material unit may facilitate contacting the adhesive layer of the connector with the continuous sheet of the additional stock material unit. This daisy-chaining may be performed between the wall portions 150a and 150b.

The strap assemblies 500 may be spaced from each other along a traverse direction of the three-dimensional body of the stock material units. For example, the strap assemblies may be spaced from each other such that the center of gravity of the three-dimensional body is located between two strap assemblies 500. Optionally, the strap assemblies 500 may be equidistantly spaced from the center of gravity. In various embodiments, the strap assemblies still fit in the space between the wall portions 150a and 150b so that the strap assemblies 500 can be accessed even when the wall portions 150a and 150b are closed, as shown in FIG. 5B As described above, the stock material units 300a-f (or in some embodiments one unit 300 is used) may be placed into a dunnage conversion machine 100 forming the dunnage system 50. Additionally or alternatively, multiple stock material units (e.g., similar to or the same as the stock material unit 300) may be stacked on top of another in the dunnage conversion machine. The stock material unit may include one or more strap assemblies 500. For example, the strap assemblies 500 may remain wrapped about the three-dimensional bodies of the stock material units after placement and may be removed thereafter (e.g., the strap assemblies 500 may be cut at one or more suitable locations and pulled out).

Furthermore, it should be appreciated that, generally, the three-dimensional body of any of the stack material units described herein may be stored, transported, used in a dunnage conversion machine, or combinations thereof without any wrapping (or strapping) or with more or different straps or wrappings than the strap assemblies discussed herein. For example, a twine, paper, shrink-wrap, and other suitable wrapping or strapping material may secure together one or more sheets that define the three-dimensional body of any of the stock material units described herein. Similarly, the above-described method and structure of supporting the three-dimensional body of the stock material unit may facilitate wrapping of the three-dimensional body with any number of suitable wrapping or strapping materials and/or devices. Further details of the strap assemblies 500 and the daisy-chaining splice elements 400 are disclosed in application Ser. No. 15/593,007, entitled "Stock Material Units For A Dunnage Conversion Machine" filed concurrently herewith, which is incorporated herein by reference in its entirety.

Figure 6A:
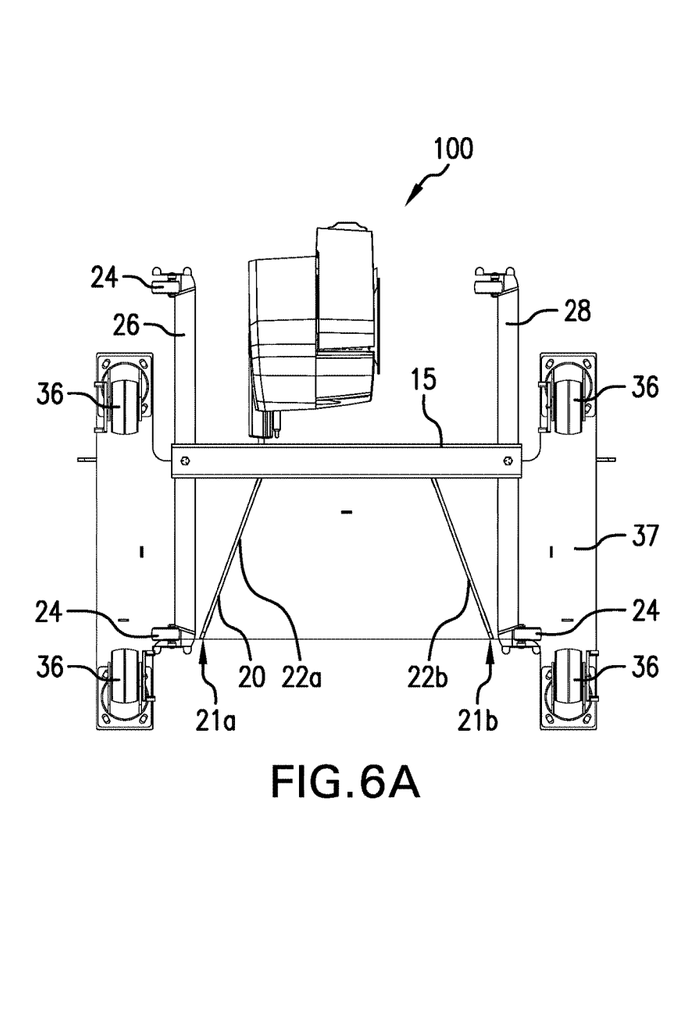
FIG. 6A is a bottom view of the cart and dunnage conversion machine of FIG. 1A shown in an engaged position.

As discussed above and shown in FIGS. 6A and 6B, the cart 34 moves relative to the dunnage forming machine 100. The dunnage forming machine 100 includes a stand 12 with a base 15. The base 15 includes low-friction devices 24 such as casters as well as a frame. In one example, the frame includes supports 24 and 28. The supports 24 may define the transverse limits of the frame and/or the front and rear limits of the frame. In some examples, the low-friction devices 24 (e.g. casters) are also located at the transverse limits and/or the front and rear limits of the frame. In accordance with various embodiments, an alignment device 20 may control and/or position the cart relative to the stand. The alignment device 20 may be positioned on either the cart or the stand. For simplicity, the alignment device 20 will be discussed herein as being located on the cart, with the understanding that the features and functionality of the cart may be applied to the stand base in accordance with the description and disclosure herein. The alignment device 20 may control the limits and supports discussed above in order to position the dunnage forming machine 100 in relationship to the cart.

Figure 6B:
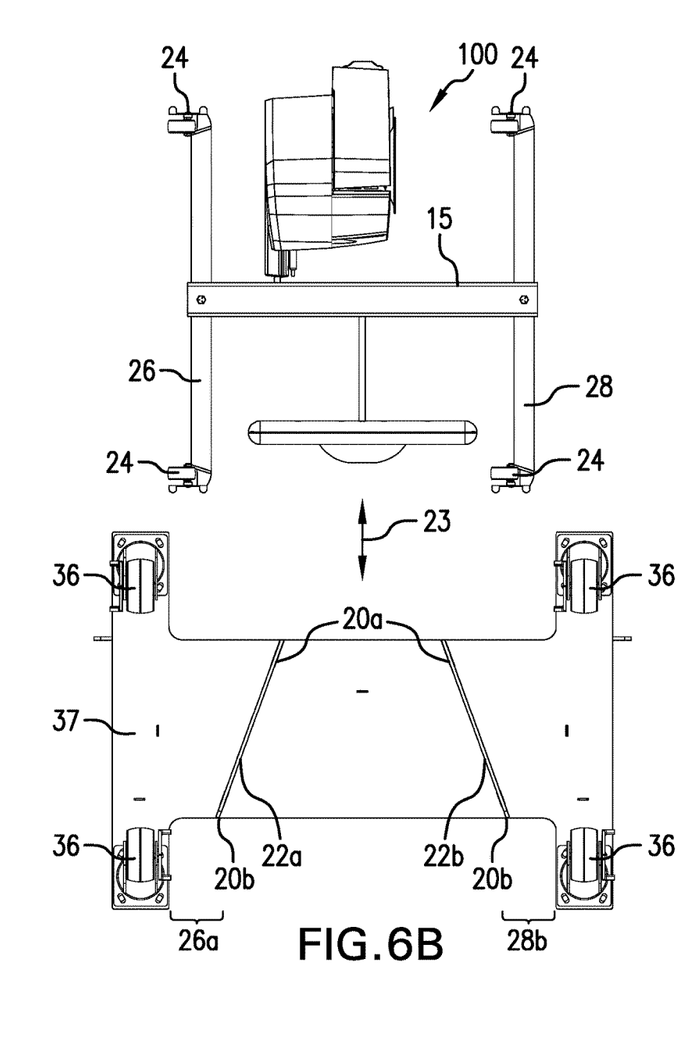
FIG. 6B is the cart and the dunnage conversion machine of FIG. 1A shown in a disengaged position.

In accordance with various embodiments, the cart 34 includes an alignment device 20 that positions the dunnage forming machine 100 relative to the cart 34. In one example, the alignment device 20 forms part of the base 37 of the cart 34. In this way, the base 37 of the cart 34 interacts directly with the base 15 of stand 12, thereby positioning the entirety of the dunnage machine 100 relative to the entirety of the cart 34. In one example, the alignment device 20 includes converging docking members forming a funnel or wedge shaped structure positioned on the base 37. The funnel includes a wide side and a narrow side. Using the alignment device 20 having a funnel shape, the cart 34 and the dunnage machine 100 can be moved together without initial interference, but as the two devices are moved closer together the interference and the resultant effect of positioning is increased. For example, the funnel device can be located on the bottom side of the base 37. As shown in FIG. 6B, the narrow end of the funnel 20a can be located easily between the supports 26 and 28 and the casters 24 located thereon. As the dunnage machine 100 and the cart 34 are moved toward one another along direction 23, the funnel widens out to end 20b. End 20b may contact and interfere with the supports 26 and 28 at the interference locations 21a and 21b (see FIG. 6A), both centering the cart and the dunnage machine with respect to one another and stopping movement toward one another.

In another example, the wide side of the funnel 20b may capture the supports 26 and 28 inside of the funnel. As the cart and the dunnage machine approach each other the funnel constricts, creating greater engagement and thereby positioning the dunnage machine with respect to the cart.

In accordance with various embodiments, the converging docking members defining the funnel shape structure 20 are two flanges protruding from the bottom of cart 34. The two flanges 22a and 22b converge toward one another forming the funnel shape structure. In accordance with one embodiment, the end of flange 22b on the funnel side 20b may be a distance 28b away from the casters 36 on the same side that allows support 28 to fit there between, securing the desired position. The end of flange 22a on the funnel side 20b may be a distance 26a away from the casters 36 on the same side that allows support 26 to fit there between, securing the desired position. With both supports 26 and 28 secured between the funnel end 20b and the casters on the side respective to each of supports 26 and 28, the cart 34 is aligned with the dunnage machine 100 at the desired distance and center. In some embodiments, the cross member of cart 15 may engage the funnel side 20a to limit the depth of approach between the cart 34 and the dunnage machine 100. In this way, the alignment device aligns the stand 12 and base 15 with the cart 34.

One having ordinary skill in the art should appreciate that there are numerous types and sizes of dunnage for which there can be a need or desire to accumulate or discharge according to an exemplary embodiment of the present invention. As used herein, the terms "top," "bottom," and/or other terms indicative of direction are used herein for convenience and to depict relational positions and/or directions between the parts of the embodiments. It will be appreciated that certain embodiments, or portions thereof, can also be oriented in other positions. In addition, the term "about" should generally be understood to refer to both the corresponding number and a range of numbers. In addition, all numerical ranges herein should be understood to include each whole integer within the range.

While illustrative embodiments of the invention are disclosed herein, it will be appreciated that numerous modifications and other embodiments may be devised by those skilled in the art. For example, the features for the various embodiments can be used in other embodiments. The converter having a drum, for example, can be replaced with other types of converters. Therefore, it will be understood that the appended claims are intended to cover all such modifications and embodiments that come within the spirit and scope of the present invention.

What is claimed is:

1. A fanfold stock material supply cart, comprising:
a bottom support;
opposing vertical side supports that extend from the bottom support, the opposing vertical side supports defining a storage volume that retains the fanfold stock material supply, with the opposing vertical side supports retaining the fanfold stock material in the transverse direction; and
a first biased support that is associated with the opposing vertical side supports and is movable from an open position to a closed position with respect to the opposing vertical side supports such that in the closed position, the first biased support is configured to at least partially block an opening between the opposing vertical side supports, and in the open position the first biased support leaves the opening between the opposing vertical side supports sufficiently open to load fanfold stock material therein, wherein the first biased support is biased toward each of the closed and open positions, such that the first biased support is retained selectively in the closed or open position.

2. A dunnage system comprising:
the fanfold stock material supply cart of claim 1; and
a dunnage machine configured to receive the stock material from the fanfold stock material supply cart and convert the stock material to low density dunnage.

3. The dunnage system of claim 2, wherein the first biased support is biased such that the first biased support requires a greater force to be applied to move from the closed position than from the open position.

4. The dunnage system of claim 2, wherein the first biased support extends substantially to the bottom of the opening.

5. The dunnage system of claim 4, wherein the bias in the closed position and the open position is caused by gravity as the first biased support raises then lowers as the first biased support travels from the closed position to the open position or from the open position to the closed position.

6. The dunnage system of claim 2, wherein the opposing vertical side supports are fixed relative to the bottom support.

7. The dunnage system of claim 2, further comprising a second biased support disposed on an opposite side of the opening from the first biased support and associated with the opposing vertical side supports movably with respect to the vertical side supports between a closed positions, in which the second biased support partially blocks the opening, and an open position, in which the second biased support leaves the opening between the opposing vertical side supports sufficiently open to load the fanfold stock material therein, and wherein the second biased support is biased to be retained in the closed position.

8. The dunnage system of claim 7, wherein the first biased support retains a first transverse end of the fanfold material and the second biased support retains a second transverse end of the fanfold material.

9. The dunnage system of claim 7, wherein in the closed position, the first biased support and the second biased support have a gap therebetween that is suitable in size to allow a user to access and daisy-chain the stock material together.

10. The dunnage system of claim 2, wherein the dunnage machine has a stand having a stand base, and the stock material supply cart has a base with a low-friction device configured to allow the base to move relative to the ground and to the dunnage machine.

11. The dunnage system of claim 10, wherein at least one of the stand base or the stock material supply cart base includes an alignment device located on the bottom side thereof, defined by two converging docking members forming a funnel thereon.

12. The dunnage system of claim 11, wherein the alignment device is configured to receive the stand base or the stock material supply cart base not having the alignment device causing the stand and the stock material supply cart to consistently align together in response one of the stand base or the stock material supply cart base being received into the other.

13. The dunnage system of claim 12, wherein the alignment device is positioned on the stock material supply cart base.

14. The dunnage system of claim 13, wherein the two converging docking members includes two opposing flanges extending from the bottom of the stock material supply cart base.

15. The dunnage system of claim 14, wherein the opposing flanges are angled with respect to one another.

16. The dunnage system of claim 15, wherein the opposing flanges have a narrow side and a wide side, the narrow side includes flange ends that are closest to one another and the wide side includes flange ends that are farther from each other.

17. The fanfold stock material supply cart of claim 7, wherein the opposing vertical side supports are spaced at a first transverse distance, and in the first closed position the first and second biased supports are positioned such that the opening is narrower in the transverse direction than the first transverse distance.

18. The supply cart of claim 1, wherein:
the first biased support includes at least one of a track or a follower;
the opposing vertical side supports include the other of a track or follower, which cooperates with the track or follower of the first biased support to guide the first biased support between the open and closed positions.

19. The supply cart of claim 1, wherein the first biased support moves in a nonlinear path from the open position to the closed position, wherein the non-linear path has a middle portion that is at a different height than the end portions, and wherein the first biased support is biased towards the end portions.

20. A dunnage system, comprising:
the supply cart of claim 1; and
the fanfold stock material, which has a transverse width and is receivable between the opposing vertical side supports, wherein in the open position, the opening is wider than the transverse width of the fanfold stock material, and in the closed position the first biased support blocks the opening sufficiently to leave an open width narrower than the transverse width of the fanfold stock material.

21. A fanfold stock material supply cart, comprising:
a bottom support;
opposing vertical side supports that extend from the bottom support, the opposing vertical side supports defining a storage volume that retains the fanfold stock material supply, with the opposing vertical side supports retaining the fanfold stock material in the transverse direction; and
a first support that is connected to one of the opposing vertical side supports and is movable from an open position to a closed position with respect to the opposing vertical side supports such that in the closed position, the first support is configured to at least partially block an opening between the opposing vertical side supports, and in the open position the first support leaves the opening between the opposing vertical side supports sufficiently open to load fanfold stock material therein, wherein the first support is associated with the one of the opposing vertical supports such that the first support is held by gravity selectively in the closed and open positions, and wherein the first support extends substantially to the bottom of the opening.

22. The fanfold stock material supply cart of claim 21, further comprising a second support associated with the opposing vertical side supports such that the first and second supports are on opposite sides of the supply cart movably between an open position, in which the first and second supports leave the opening sufficiently open to load the fanfold stock material between the first and second supports, and a closed position, wherein the first and second supports in the closed position cooperatively partially block the opening.

23. The fanfold stock material supply cart of claim 21, wherein the first support is held in the closed position by gravity.

24. The fanfold stock material supply cart of claim 21, wherein the first support is held in the open position by gravity.

25. The fanfold stock material supply cart of claim 21, wherein the first support is held closed by gravity when in the closed position and is held open by gravity when in the open position.

26. The fanfold stock material supply cart of claim 21, wherein:
the first support includes at least one of a track or a follower; and
the opposing vertical side supports include the other of the track or follower, which cooperates with the track or follower of the first support to guide the first support between the open and closed positions, wherein the track has a mid-portion that is at a different height than the end portions so that gravity retains the first support in each of the open and closed positions.

\* \* \* \* \*